United States Patent
Proud et al.

(10) Patent No.: US 11,469,908 B2
(45) Date of Patent: Oct. 11, 2022

(54) EQUIPMENT ONBOARDING AND DEPLOYMENT SECURITY SYSTEM

(71) Applicant: BANK OF AMERICA CORPORATION, Charlotte, NC (US)

(72) Inventors: Lee Ann Proud, Ponte Vedra, FL (US); Joseph Benjamin Castinado, North Glenn, CO (US); Martha Sain McClellan, Lancaster, SC (US); Kathleen Hanko Trombley, Oakboro, NC (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 564 days.

(21) Appl. No.: 16/534,812

(22) Filed: Aug. 7, 2019

(65) Prior Publication Data
US 2021/0044442 A1 Feb. 11, 2021

(51) Int. Cl.
| | |
|---|---|
| H04L 9/32 | (2006.01) |
| G06F 8/61 | (2018.01) |
| H04L 41/00 | (2022.01) |
| H04L 47/70 | (2022.01) |
| H04L 67/10 | (2022.01) |
| H04L 12/66 | (2006.01) |

(52) U.S. Cl.
CPC ............. *H04L 9/3268* (2013.01); *G06F 8/61* (2013.01); *H04L 41/20* (2013.01); *H04L 47/82* (2013.01); *H04L 67/10* (2013.01); *H04L 12/66* (2013.01)

(58) Field of Classification Search
None
See application file for complete search history.

(56) References Cited

U.S. PATENT DOCUMENTS

| | | | |
|---|---|---|---|
| 6,167,378 A * | 12/2000 | Webber, Jr. | ...... G06Q 10/06315 705/7.25 |
| 7,212,976 B2 | 5/2007 | Scheer | |
| 7,313,534 B2 | 12/2007 | Scheer | |
| 7,324,966 B2 | 1/2008 | Scheer | |
| 8,194,646 B2 | 6/2012 | Elliott et al. | |
| 8,204,799 B1 | 6/2012 | Murray et al. | |
| 8,719,339 B2 | 5/2014 | Reisman | |
| 9,026,079 B2 | 5/2015 | Raleigh et al. | |
| 9,185,641 B2 | 11/2015 | Ilsar et al. | |
| 9,246,759 B2 | 1/2016 | Gurajala et al. | |

(Continued)

*Primary Examiner* — William G Trost, IV
*Assistant Examiner* — Christopher P Cadorna
(74) *Attorney, Agent, or Firm* — Moore & Van Allen PLLC; James C. Edwards

(57) ABSTRACT

A system that provides for management of resource interaction equipment fulfillment via a gateway apparatus that uses Application Programming Interface (API) services to connect and integrate with the various systems deployed by the equipment providers, such that, all data communication between the managing entity and the equipment providers is orchestrated through the gateway apparatus to track the occurrence of events associated with resource interaction equipment fulfillment. Additionally, a distributed trust computing network is implemented in which each of the equipment providers serve as a decentralized node in the distributed trust computing network capable of converging on a data block to verify the validity of the equipment fulfillment process event stored in the block.

17 Claims, 5 Drawing Sheets

(56) References Cited

U.S. PATENT DOCUMENTS

| | | |
|---|---|---|
| 9,466,054 B1 | 10/2016 | Bradley et al. |
| 10,034,237 B2 | 7/2018 | Pularikkal et al. |
| 10,367,802 B2 | 7/2019 | Koushik et al. |
| 10,373,217 B2 | 8/2019 | Dueck et al. |
| 10,565,579 B2 | 2/2020 | Checketts et al. |
| 10,616,244 B2 | 4/2020 | Bryan et al. |
| 2008/0120240 A1 | 5/2008 | Ginter et al. |
| 2010/0205044 A1 | 8/2010 | Scheer |
| 2013/0311771 A1* | 11/2013 | Hoggan ................ H04L 9/3268 713/156 |
| 2014/0089032 A1 | 3/2014 | Bell |
| 2015/0151913 A1 | 6/2015 | Wong et al. |
| 2016/0155163 A1* | 6/2016 | White ................ G06Q 30/0611 705/26.2 |
| 2016/0359632 A1* | 12/2016 | Mohajeri ............... H04W 12/02 |
| 2019/0096522 A1* | 3/2019 | Scriber ................ H04L 9/3239 |
| 2019/0237176 A1* | 8/2019 | O'Brien ................ H04L 9/3239 |
| 2020/0036696 A1 | 1/2020 | Schatzmann et al. |

\* cited by examiner

EQUIPMENT ONBOARDING AND DEPLOYMENT SECURITY SYSTEM

FIELD OF THE INVENTION

The present invention is generally related to resource interaction equipment fulfillment and, more specifically, managing resource interaction equipment fulfillment through a gateway apparatus that connects and integrates open API (Application Programming Interface) services with external resource interaction equipment provider systems to orchestrate all data communications between the gateway apparatus and the equipment provider systems.

BACKGROUND

Typically, resource interaction equipment is highly customized depending on how the resource interaction equipment user desires to accept resources and the environment in which the resource interaction equipment is deployed. Additionally, since the resource interaction equipment is effectively a computing platform other customization may include other uses besides resource interactions that relevant to the user's other functions.

Since the equipment is typically customized, many different resource interaction equipment providers are utilized in the fulfillment of resource interaction equipment requests. As such the entity in control or otherwise procuring the resource interactions equipment for the users has a desire to manage the fulfillment process of such equipment to ensure that equipment meets requisite fulfillment requirements in terms of technical requirements, quality requirements, time for delivery and the like.

Therefore, a need exists to develop systems, methods, computer program products and the like that provide for managing the resource interaction equipment fulfillment process. The desires systems and the like should provide for a centralized entity in control or otherwise procuring the resource interaction equipment to manage/orchestrate the data communications between all of the resource interaction equipment providers. Moreover, a need exists to guarantee a high level of security within all of the data communications and insure that information pertaining to resource interaction equipment fulfillment process is disseminated to resource interaction equipment providers on a need-to-know basis. Moreover, a need exists for the centralized entity to have a dynamic view of the current state of the fulfillment process, such that dynamic changes to the fulfillment process can be made to insure adherence to fulfillment requirements.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, methods, computer program product and/or the like that provides for management of resource interaction equipment fulfillment to insure that a managing entity, such as the entity responsible for providing the resource interaction equipment to end users, is dynamically aware at any point-in-time as to the status of the overall fulfillment process.

In this regard, the present invention implements a gateway apparatus that uses Application Programming Interface (API) services to connect and integrate with the various systems deployed by the equipment providers (i.e., all of the entities that provide a component or a service in the equipment fulfillment process), such that, all data communication between the managing entity and the equipment providers is orchestrated through the gateway apparatus to track the occurrence of events associated with resource interaction equipment fulfillment. As such, the gateway apparatus provides the managing entity with information pertaining to the fulfillment process that a tracking module or the like can then use to provide a dynamic workflow status of the overall equipment fulfillment process. Moreover, the gateway apparatus is able to disseminate workflow information or the like to upstream and/or downstream equipment providers on a need-to-know basis without the upstream and/or downstream equipment providers being in direct communication with each other.

In additional embodiments of the invention, a distributed trust computing network, otherwise referred to as a blockchain network is implemented in which each of the equipment providers serve as a decentralized node in the distributed trust computing network. The network stores blocks of data within distributed ledgers, wherein each block of data includes information pertaining to the least one of the events of the equipment fulfillment process and/or metadata information pertaining to the equipment itself (e.g., serial numbers of the equipment and/or components, revisions of software, when and by whom components/software were installed and the like). Access to each block is configurable such that access to the block is granted to equipment providers on a need-to-know basis. Moreover, two or more decentralized nodes of the distributed trust computing are configured to converge on a block of data to verify the validity of the information contained therein. The distributed ledger serves as an immutable system of record for the verifying the events that occurred in the equipment fulfillment process.

A system for managing resource interaction equipment fulfillment defines first embodiments of the invention. The system includes a plurality of resource interaction equipment provider systems. Each of the resource interaction equipment provider systems are associated with one of a plurality of resource interaction equipment providers and track a resource interaction equipment provider-specific workflow related to fulfilling a resource interaction equipment provision. The system additionally includes a gateway apparatus including a first computing platform having a first memory, one or more first processing devices in communication with the first memory, and one or more Application Programming Interface (API) services. The API services are executable by the one or more first processing devices and are collectively configured to connect and integrate with the plurality of resource interaction equipment provider systems. Integrating includes deploying and implementing a trusted entity security certificate for securing data communications between the gateway apparatus and the plurality of resource interaction equipment provider systems and orchestrating a flow of data communication between the gateway apparatus and the plurality of resource event equipment providers. The system additionally includes a tracking module that is stored in a second memory of a second computing platform and executable by one or more second processing devices in communication with the second memory. The tracking module is configured to establish, based on the flow of communication between the gateway apparatus and the plurality of resource interaction equipment providers, a dynamic overall workflow that tracks progress in fulfillment of the resource interaction equipment provision.

In specific embodiments the system additionally includes at least one distributed trust computing network, otherwise referred to as a blockchain network. The distributed trust computing network includes a plurality of decentralized nodes. Each decentralized node has a second memory and one or more second processing devices in communication with the second memory. The second memory of the decentralized nodes is configured to store at least one distributed ledger including a plurality of blocks of data. Each block of data stores information pertaining to at least one data communication between the gateway apparatus and one of the plurality of resource interaction equipment providers and/or metadata information pertaining to the equipment itself (e.g., serial numbers of the equipment and/or components, revisions of software, when and by whom components/software were installed and the like). In such embodiments of the system, each of the plurality of resource interaction equipment providers are associated with one of the decentralized nodes and two or more of the decentralized nodes converge on each block of data within the at least one distributed ledger to verify a validity of the information pertaining to the least one data communication. In further related embodiments of the system, each block of data within the at least one distributed ledger is configurable to provide access to the block of data to one or more designated resource interaction equipment providers.

In further specific embodiments of the system, the API services are configured to orchestrate the flow of data communication between the gateway apparatus and the plurality of resource interaction equipment providers. The data communication includes (i) commands from the gateway apparatus to perform one or more actions associated with fulfilling a resource interaction equipment provision, and (ii) responses from the resource interaction equipment providers indicating one of receipt of the commands, status of the one or more actions and completion of the one or more actions.

In other specific embodiments of the system, the plurality of resource interaction equipment providers include (i) component manufacturers for components comprising the resource interaction equipment, (ii) equipment manufacturers for the resource interaction equipment, software providers for installing software on the resource interaction equipment, (iii) warehouse provides for physically storing the resource interaction equipment, and (iv) shipment provides for delivering components and resource interaction equipment to providers and resource interaction equipment users.

In yet other specific embodiments, the system includes a plurality of resource interaction equipment user systems. Each of the resource interaction equipment user systems are associated with one of a plurality of resource interaction equipment users. In such embodiments of the system, the API services are further collectively configured to connect and integrate with the plurality of resource interaction equipment user systems. Integrating includes deploying and implementing the trusted entity security certificate for securing data communications between the gateway apparatus and the plurality of resource interaction equipment user systems and orchestrating a flow of data communication between the gateway apparatus and the plurality of resource event equipment users. In related embodiments the system includes at least one distributed trust computing network, otherwise referred to as a blockchain network. The distributed trust computing network includes a plurality of decentralized nodes. Each decentralized node has a second memory and one or more second processing devices in communication with the second memory. The second memory of the decentralized nodes is configured to store at least one distributed ledger that includes a plurality of blocks of data. Each block of data stores information pertaining to at least one data communication between the gateway apparatus and one of the resource interaction equipment users and/or metadata information pertaining to the equipment itself (e.g., serial numbers of the equipment and/or components, revisions of software, when and by whom components/software were installed and the like).

Moreover, in further specific embodiments of the system, the tracking module is further configured to establish a list that tracks which of the plurality of API services are connected and integrated with which of the plurality of resource interaction equipment provider systems.

A computer-implemented method for managing resource interaction equipment fulfillment defines second embodiments of the invention. The method is executed by one or more computing processor devices. The method includes connecting one or more Applications Programming Interface (API) services with a plurality of resource interaction equipment provider systems. The method additionally includes deploying and implementing, through the one or more API, services, a trusted entity security certificate at the resource interaction equipment provider systems for securing data communications between the gateway apparatus and the plurality of resource interaction equipment provider systems. Further the method includes orchestrating, through the one or more API services, a flow of data communication between the gateway apparatus and the plurality of resource event equipment providers. Additionally, the method includes establishing, based on the flow of communication between the gateway apparatus and the plurality of resource interaction equipment providers, a dynamic overall workflow that tracks progress in fulfillment of the resource interaction equipment provision.

In specific embodiments the method further includes storing, within data blocks of at least distributed ledger stored within memory of a plurality of decentralized nodes of a distributed trust computing network, information pertaining to at least one data communication between the gateway apparatus and one of the resource interaction equipment providers. In such embodiments the method may further include verifying validity of the information pertaining to at least one data communication based on two or more of the decentralized nodes converging on the data block containing the information, wherein each of the plurality of resource interaction equipment providers are associated with one of the decentralized nodes.

In other specific embodiments of the method, orchestrating the flow of data communication further comprises orchestrating the flow of data communication including (i) commands from the gateway apparatus to perform one or more actions associated with fulfilling a resource interaction equipment provision, and (ii) responses from the resource interaction equipment providers indicating one of receipt of the commands, status of the one or more actions and completion of the one or more actions.

In other specific embodiments of the method, the plurality of resource interaction equipment providers include (i) component manufacturers for components comprising the resource interaction equipment, (ii) equipment manufacturers for the resource interaction equipment, software providers for installing software on the resource interaction equipment, (iii) warehouse provides for physically storing the resource interaction equipment, and (iv) shipment provides for delivering components and resource interaction equipment to providers and resource interaction equipment users.

In still further specific embodiments, the method includes establishing a list that tracks which of the plurality of APIs are connected with which of the plurality of resource interaction equipment provider systems.

A computer program product including a non-transitory computer-readable medium defines third embodiments of the invention. The computer-readable medium includes a first set of codes for causing a computer to connect one or more Applications Programming Interface (API) services with a plurality of resource interaction equipment provider systems. Additionally, the computer-readable medium includes a second set of codes for causing a computer to deploy and implement, through the one or more API, services, a trusted entity security certificate at the resource interaction equipment provider systems for securing data communications between the gateway apparatus and the plurality of resource interaction equipment provider systems. In addition, the computer-readable medium includes a third set of codes for causing a computer to orchestrate, through the one or more API services, a flow of data communication between the gateway apparatus and the plurality of resource event equipment providers. Moreover, the computer-readable medium includes a fourth set of codes for causing a computer to establish, based on the flow of communication between the gateway apparatus and the plurality of resource interaction equipment providers, a dynamic overall workflow that tracks progress in fulfillment of the resource interaction equipment provision.

In specific embodiments of the computer program product, the computer-readable medium includes a fifth set of codes for causing a computer to store, within data blocks of at least distributed ledger stored within memory of a plurality of decentralized nodes of a distributed trust computing network, information pertaining to at least one data communication between the gateway apparatus and one of the plurality of resource interaction equipment providers. In such embodiments of the computer program product, the computer-readable medium may include a sixth set of codes for causing the computer to verify validity of the information pertaining to at least one data communication based on two or more of the decentralized nodes converging on the data block containing the information, wherein each of the plurality of resource interaction equipment providers are associated with one of the plurality of decentralized nodes.

In further specific embodiments of the computer program product, the third set of codes are further configured to orchestrate the flow of data communication between the gateway apparatus and the plurality of resource interaction equipment providers, wherein the data communication includes (i) commands from the gateway apparatus to perform one or more actions associated with fulfilling a resource interaction equipment provision, and (ii) responses from the resource interaction equipment providers indicating one of receipt of the commands, status of the one or more actions and completion of the one or more actions.

In still further specific embodiments of the computer program product, the plurality of resource interaction equipment providers include (i) component manufacturers for components comprising the resource interaction equipment, (ii) equipment manufacturers for the resource interaction equipment, software providers for installing software on the resource interaction equipment, (iii) warehouse provides for physically storing the resource interaction equipment, and (iv) shipment provides for delivering components and resource interaction equipment to providers and resource interaction equipment users.

Thus, according to embodiments of the invention, which will be discussed in greater detail below, the present invention provides for management of resource interaction equipment fulfillment via a gateway apparatus that uses Application Programming Interface (API) services to connect and integrate with the various systems deployed by the equipment providers, such that, all data communication between the managing entity and the equipment providers is orchestrated through the gateway apparatus to track the occurrence of events associated with resource interaction equipment fulfillment. Additionally, a distributed trust computing network is implemented in which each of the equipment providers serve as a decentralized node in the distributed trust computing network capable of converging on a data block to verify the validity of the equipment fulfillment process event stored in the block.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
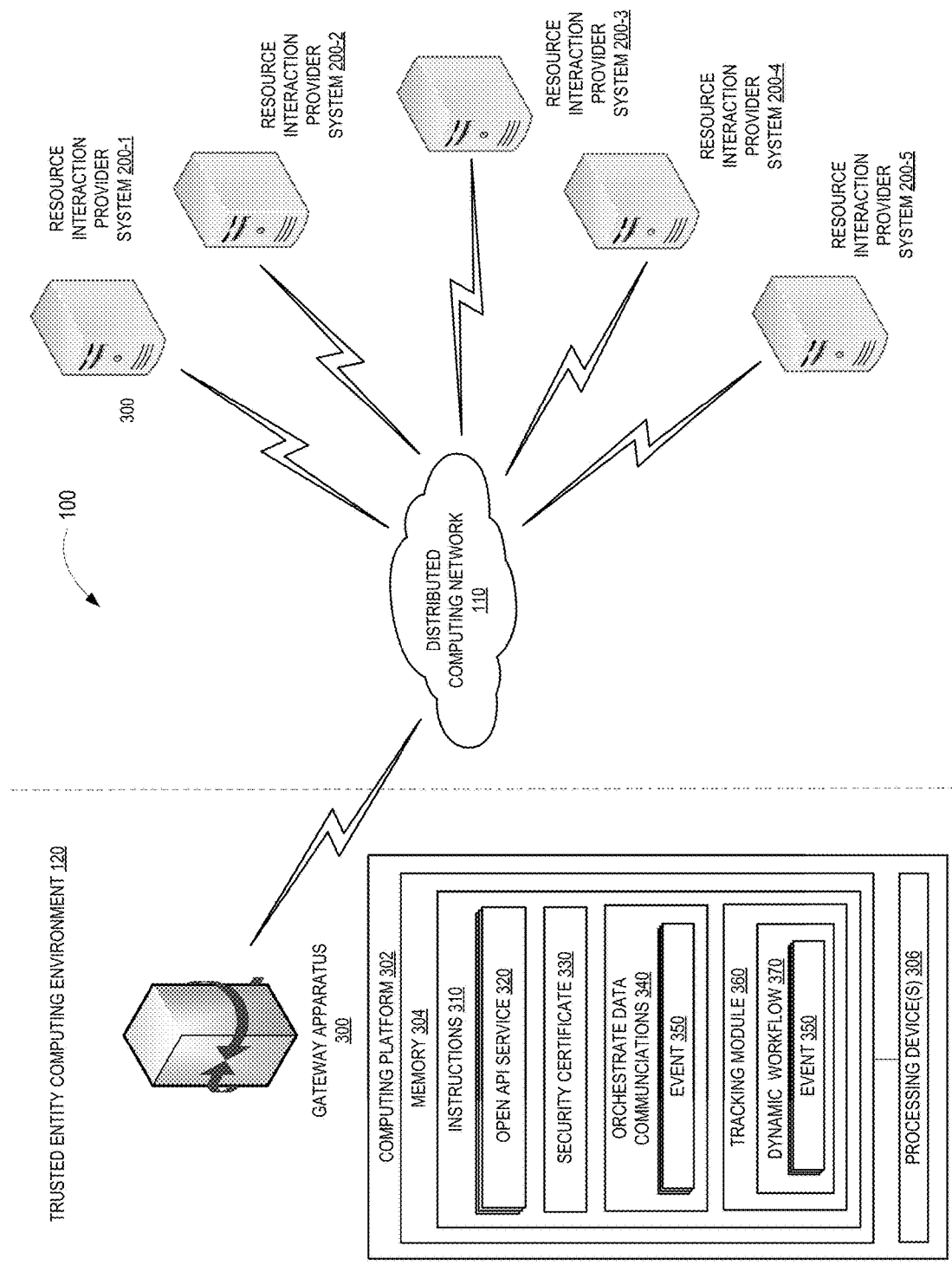
Figure 2:
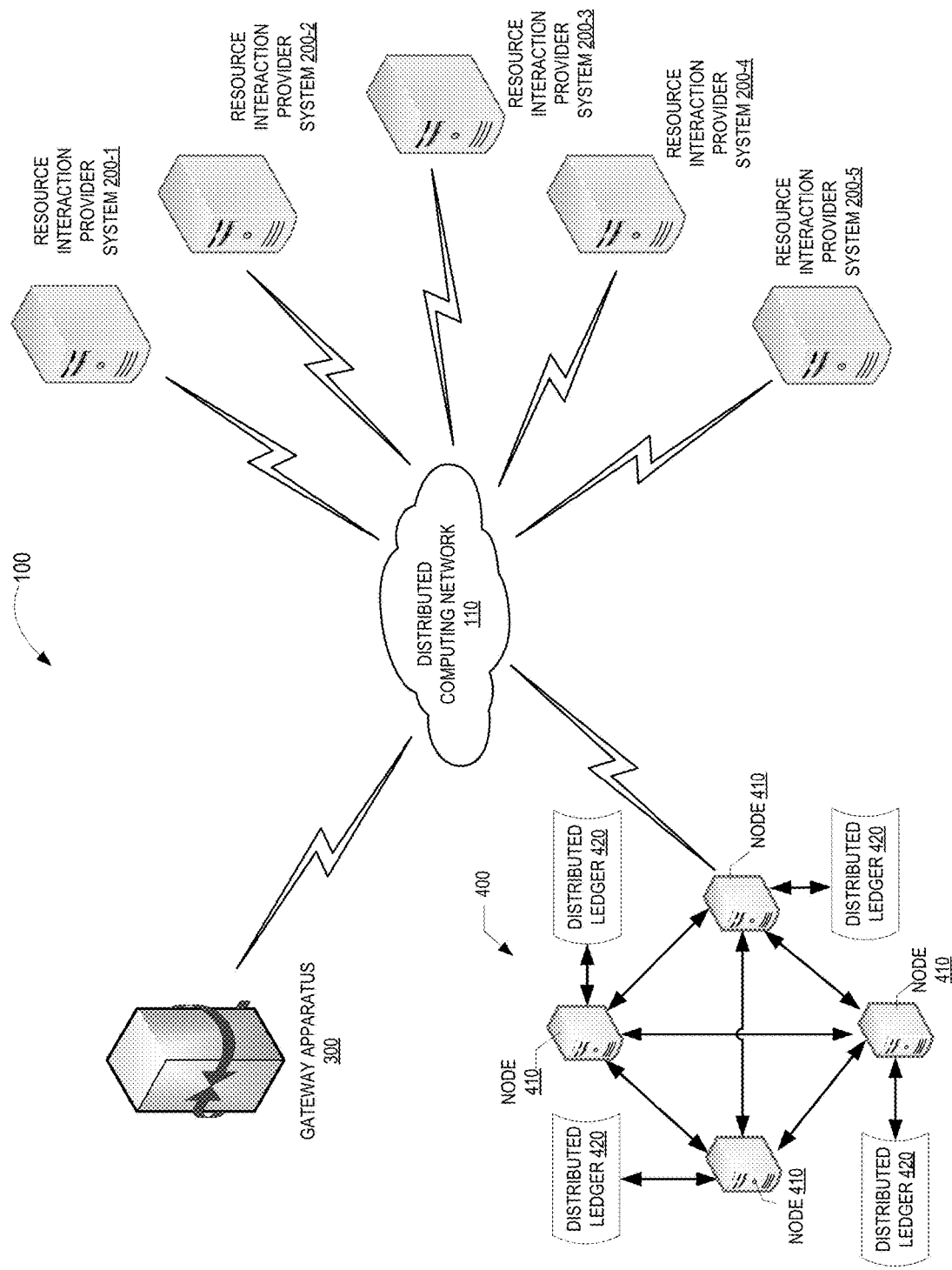
Figure 3:
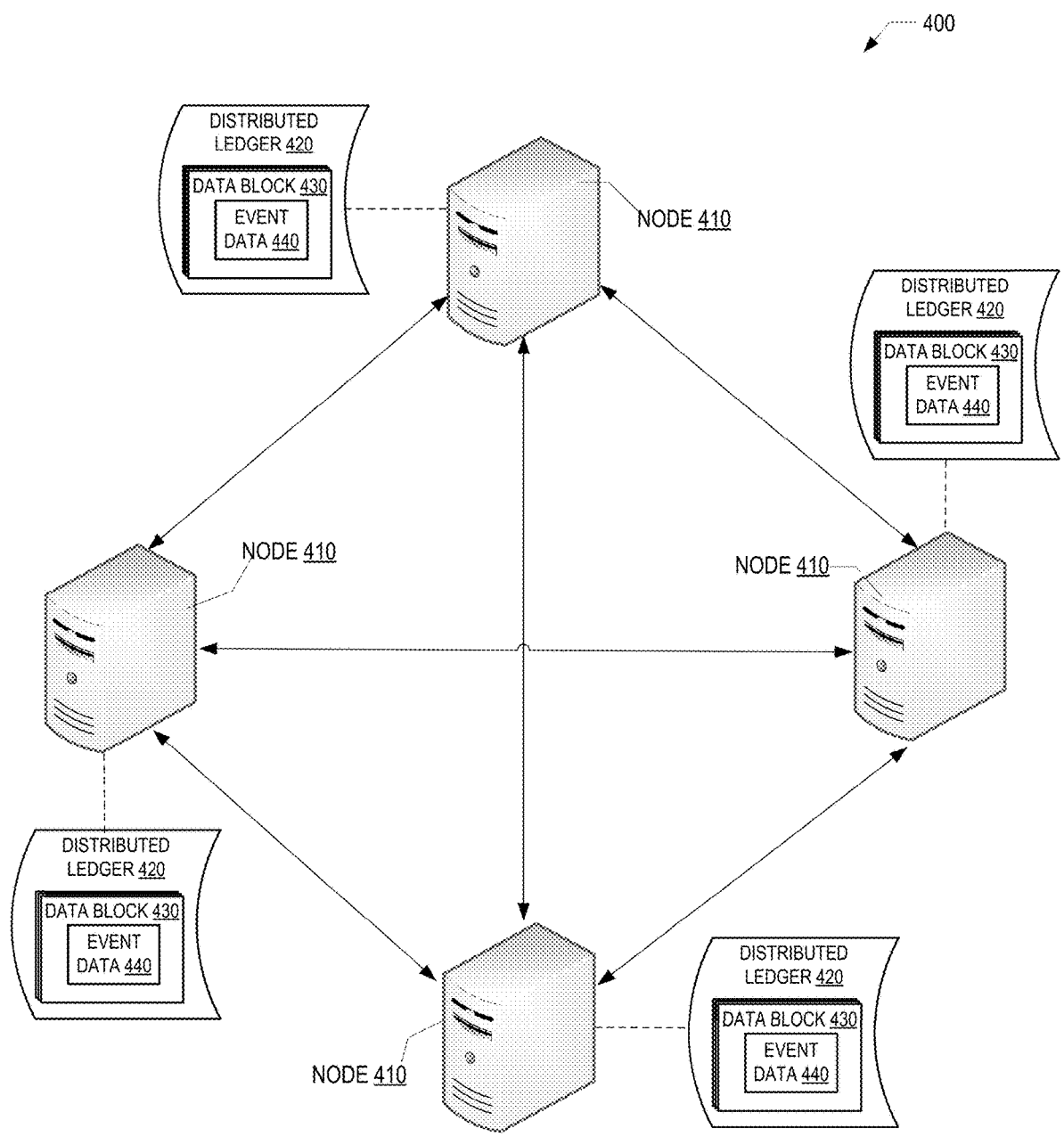
Figure 4:
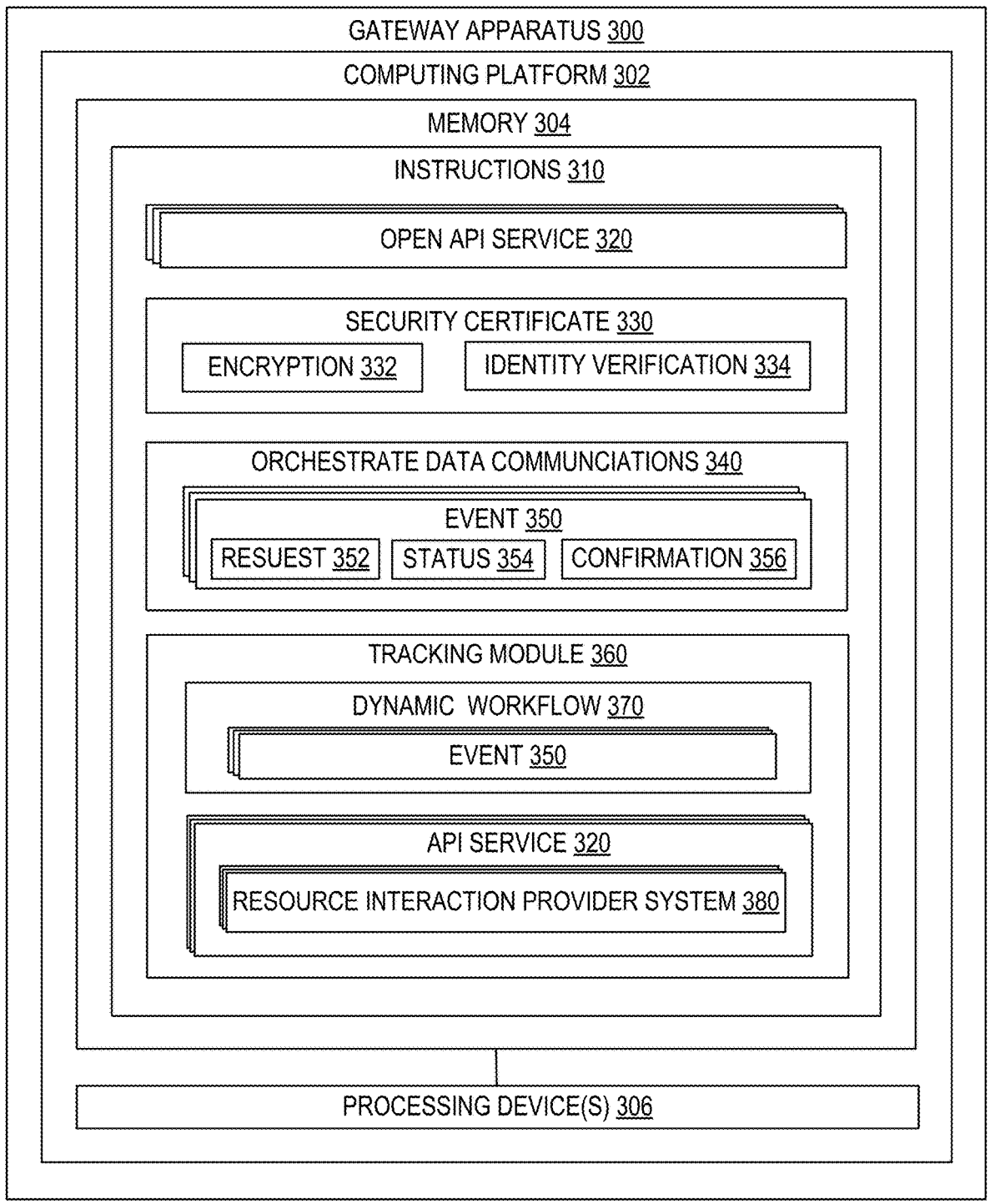
Figure 5:
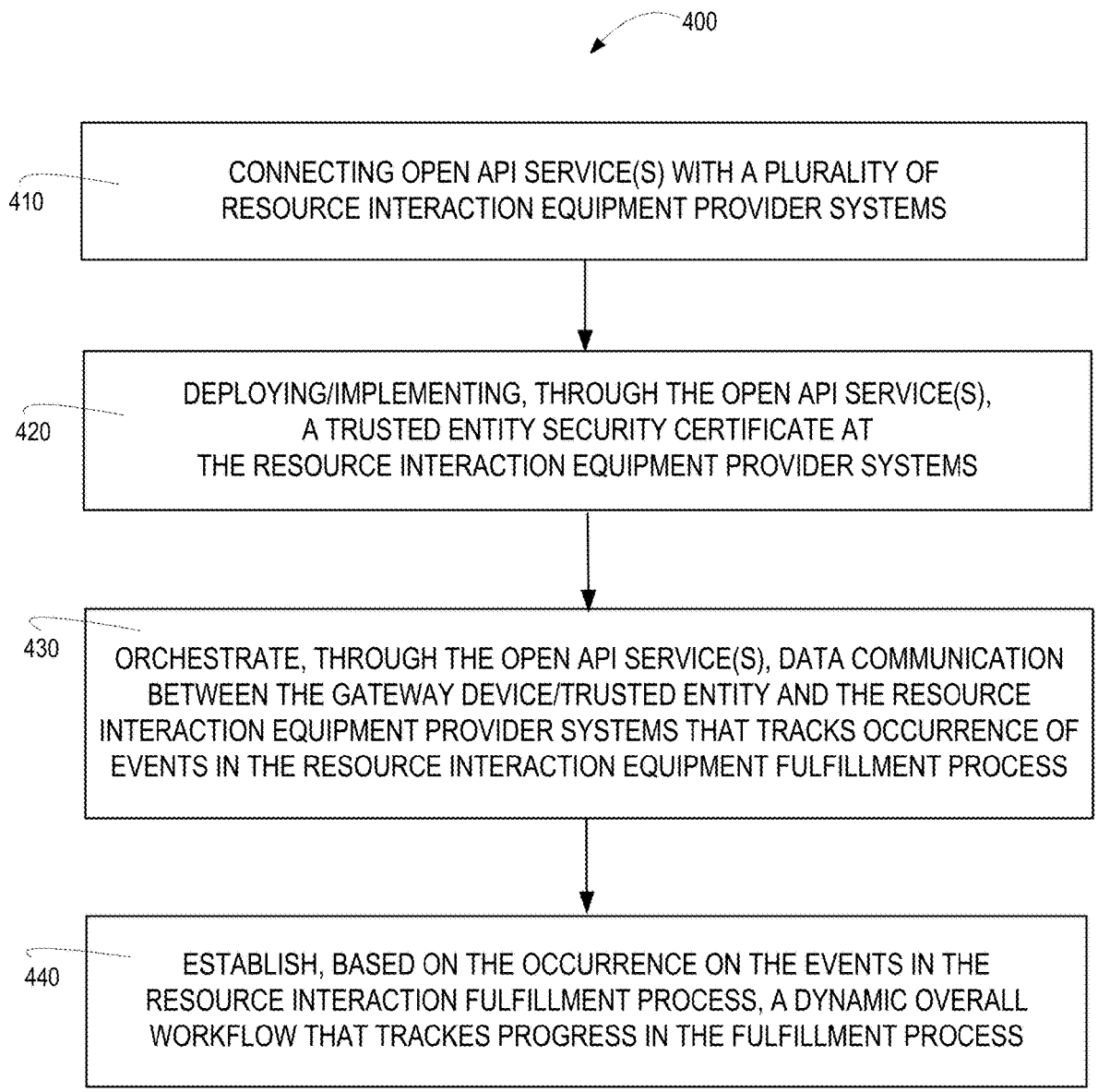

Having thus described embodiments of the disclosure in general terms, reference will now be made to the accompanying drawings, wherein:

FIG. 1 is a schematic diagram of a system for managing fulfillment of resource interaction equipment, in accordance with some embodiments of the present disclosure;

FIG. 2 is a schematic diagram of an alternate system for managing fulfillment of resource interaction equipment in accordance with some embodiments of the present disclosure;

FIG. 3 is a schematic diagram of a trusted distributed computing network, in accordance with embodiment of the present invention;

FIG. 4 is a block diagram of a gateway device used to orchestrate data communications with resource interaction equipment provider systems, in accordance with embodiments of the present invention; and FIG. 5 is flow diagram of a method for managing fulfillment of resource interaction equipment, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed that provides for management of resource interaction equipment (e.g., payment devices, such as Point-Of-Sale (POS) terminals or the like) fulfillment to insure that a managing entity, such as the entity responsible for providing the resource interaction equipment to end users, is dynamically aware at any point-in-time as to the status of the overall fulfillment process. In specific embodiments of the invention the managing entity may be a trusted entity, such as a financial institution or the like.

In this regard, the present invention implements a gateway apparatus that uses Application Programming Interface (API) services to connect and integrate with the various systems deployed by the equipment providers (i.e., all of the entities that provide a component or a service in the equipment fulfillment process, such as hardware/software manufacturers and/or installers, assemblers, warehouses, delivery/carriers and the like). As a result, all data communication between the managing entity and the equipment providers is orchestrated through the gateway apparatus to track the occurrence of events associated with the resource interaction equipment fulfillment process. As such, the gateway apparatus provides the managing entity with information pertaining to the fulfillment process that a tracking module or the like can then use to provide a dynamic workflow status of the overall equipment fulfillment process. Moreover, the gateway apparatus provides the capability to disseminate workflow information or the like to upstream and/or downstream equipment providers on a need-to-know basis without the upstream and/or downstream equipment providers being in direct communication with each other.

In additional embodiments of the invention, a distributed trust computing network, otherwise referred to as a blockchain network is implemented in which each of the equipment providers serve as a decentralized node in the distributed trust computing network. The network stores blocks of data within distributed ledgers, each block of data includes information pertaining to the least one of the events of the equipment fulfillment process. Access to each block is configurable such that access to the block is granted to equipment providers on a need-to-know basis. Moreover, two or more decentralized nodes of the distributed trust computing are configured to converge on a block of data to verify the validity of the information contained therein (i.e., verify that an event in the equipment fulfillment process occurred). As a result, the distributed ledger serves as an immutable system of record for the fulfillment of the resource interaction equipment; verifying each of the sequence of events that occurred in the equipment fulfillment process.

Turning now to the figures, FIG. 1 illustrates a system 100 for managing fulfillment of resource interaction equipment, in accordance with embodiments of the present invention.

The system 100 is implemented in a distributed computing network 110, which may include the Internet, and/or one or more intranets or the like. The system additionally includes a plurality of resource interaction equipment provider systems 200-1-200-5. In specific embodiments of the invention in which the resource interaction equipment is a payment device, such as a point-of-sale (POS) device or the like, the resource interaction equipment providers are any entity that contributes hardware and software components to the device, installs hardware/software components in the device, assembles/manufacturers the device, stores the device, delivers/ships the device or the like. The systems 200-1-200-5 may be order systems, workflow systems, inventory systems, manufacturing system, customer relationship management (CRM) systems or any other system that tracks events related to the component or service that the provider/entity provides for the resource interaction equipment. Thus, for any one resource interaction equipment provider multiple systems 200 may be included in the plurality of systems. While FIG. 1 depicts five exemplary resource interaction equipment provider systems, those of ordinary skill in the art will appreciate that a conventional resource interaction fulfillment will involve additional resource interaction equipment provider systems.

The system additionally includes a gateway apparatus 300 that located in or otherwise accessible via a trusted entity computing environment 120. In specific embodiments of the invention the trusted entity is the entity that procures the resource interaction equipment for the end user (e.g., a financial institution procuring POS devices (with financial institution-specific a payment platform) for a merchant or the like). The gateway device includes a computing platform 302 having a memory 304 and one or more processing devices 306 in communication with the memory. The memory stores instructions 310 that are executable by the processing device(s) 306 and configured to connect and integrate one or more open Application programming Interface (API) services 320 with the plurality of resource interaction equipment provider systems 200-1-200-5. Integration of the API services 320 with the resource interaction equipment provider systems 200-1-200-5 includes deploying and implementing a trusted entity security certificate 330 for securing data communications between the gateway apparatus 300 and the resource interaction equipment provider systems 200-1-200-5. As such, the present invention leverages the security features provided for by the trusted entity's security certificate.

In addition, integration of the API services 320 with the resource interaction equipment provider systems 200-1-200-5 includes orchestration 340 of data communications between the gateway device 300 and the resource interaction equipment provider systems 200-1-200-5 to track the status and occurrence of events 350 in a resource interaction equipment fulfillment process. Such orchestration may include, but is not limited to, communicating requests to the resource interaction equipment provider systems 200-1-200-5 requesting an action 350 and receiving status updates on the event and/or confirmation that event has occurred. Since the gateway apparatus 300 is in direct communication with each of the resource interaction equipment provider, the orchestration of the data communications further includes informing upstream resource interaction equipment provider as to progress/completion of downstream events that may affect the upstream resource interaction equipment provider or allowing resource interaction equipment provider to connect to the gateway to receive such information. Moreover, the information that is accessible to the resource interaction equipment providers is provider-specific, such that information is available to the providers on a need-to-know basis. As a result, the resource interaction providers are not required to be direct communication with upstream and/or downstream resource interaction equipment providers and, instead, can obtain information related to applicable upstream and/or downstream resource providers from the gateway apparatus.

Moreover, the instructions 310 include a tracking module 360 that is configured to generate a dynamic workflow 370 that tracks the progress of the resource interaction equipment fulfilment process based on the event 350 data received from the resource interaction provider systems 200-1-200-5. As such that gateway device 300 is able to provide an overall picture of the current state of the fulfillment process and assess how delays in completion of events may affect upstream providers and the overall completion of the fulfillment process.

Referring to FIG. 2 a schematic diagram of a system 100 for managing fulfilment of resource interaction equipment, in accordance with alternative embodiments of the invention. The system 100 includes a distributed trust network 400, otherwise referred to as a blockchain network that includes a plurality of decentralized nodes 410. Each decentralized node has a memory (not shown in FIG. 2) and one or more processing devices (not shown in FIG. 2) in communication with the memory. The memory stores at least one distributed ledger 420 comprising a plurality of "chained" data blocks 430 (shown in FIG. 3). Each data block 430 stores event data 440 (shown in FIG. 3), received from the gateway apparatus 300, related to at least one event 350 in the resource interaction equipment fulfillment process.

In a distributed trust computing network the security of the data maintained within the trust network is enhanced by the distributed nature of the network/block chain. The distributed trust computing network 100 typically includes several decentralized nodes 410, which may be one or more systems, machines, computers, databases, data stores or the like operably connected with one another. In some instances, each of the decentralized nodes 410 or multiple nodes 110 are maintained by different entities. A distributed trust computing network 400 typically works without a central repository or single administrator. One well-known application of a distributed trust computing network/block chain is the public ledger of transactions for cryptocurrencies such as used in bitcoin. The data records recorded in the distributed trust computing network/block chain are enforced cryptographically and stored on the nodes of the block chain.

A distributed trust computing network 400 provides numerous advantages over traditional storage networks/databases. A large number of nodes 410 of a trust network may reach a consensus, otherwise referred to as converging, regarding the validity of resources maintained with a block of the blockchain. In the present invention, two or more of the nodes 410 converge on each data block 430 stored on the distributed ledger 420 to verify the validity of the event data 440 (e.g., verify that the event has occurred or the like).

Additionally, when multiple versions of a record exist on the ledger 420 (e.g., multiple data blocks including the event data associated with the same event), multiple nodes 410 can converge on the most up-to-date version of the record, such that the most-up-to-date version of the record is the only one of the versions that is validated. For example, any node 410 within the distributed trust computing network 100 that stores a record can determine within a level of certainty whether the record can be authenticated/authorized to take place and become final by confirming that no conflicting records are confirmed by the distributed trust computing network/block chain elsewhere.

The distributed trust computing network 100 typically has two primary types of records. The first type is the record type, which consists of the actual data stored in a block 430 within a distributed ledger 420. The second type is the block type, which are records that confirm when and in what sequence certain events became recorded as part of the blockchain. Records and the events associated therewith are created by participants using the blockchain in its normal course of business, for example, when record is received, a block(s) 430 is created by users known as "miners" who use specialized software/equipment to create blocks 430. Holders (also, referred to as users) of a block 430 of the blockchain agree to store a record within the distributed trust computing network 400 and the related records are passed around to various nodes 410 of the distributed trust computing network 100. A "valid" record or related event is one that can be validated based on a set of rules that are defined by the particular system implementing the distributed trust computing network/block chain.

In accordance with embodiments of the present invention, each distributed node 410 is associated with/in control of one of the plurality of resource interaction equipment providers. As such, data blocks 430 may be configurable to be accessed in a node-specific manner (i.e., only specified resource interaction equipment providers may access specified data blocks). In this regard, the event data 440 stored in the data blocks 430 is disseminated to the providers on a need-to-know basis.

A distributed trust computing network/block chain 400 is typically decentralized—meaning that a distributed ledger 420 (i.e., a decentralized ledger) is maintained on multiple nodes 410 of the trust network/block chain 400. One node 110 in the distributed trust computing network 100/block chain may have a complete or partial copy of the entire distributed ledger 420 or set of records and/or data blocks 430 on the distributed trust computing network 400/block chain. Events (e.g., addition of a new data block) are initiated at a node 410 of a distributed trust computing network 400/block chain and communicated to the various nodes 410 of the distributed trust computing network 100/blockchain. Any of the nodes 410 can validate a record or an associated event, add the record or the details of the storage event to its copy of the distributed ledger 420, and/or broadcast the record or details of the storage event, its associated validation (in the form of a block 430) and/or other data to other nodes 410. The distributed trust computing network 100 shown in FIGS. 2 and 3 is configured to perform one or more of the steps or functions performed by the system shown in FIGS. 1 and 2, the gateway apparatus shown in FIG. 4 and the methods described by FIG. 5.

Referring to FIG. 4 a block diagram is depicted of a gateway apparatus 300 configured for managing fulfillment of resource interaction equipment, in accordance with embodiments of the present invention. The gateway apparatus includes a computing platform 302, which may comprise one or more computing devices (e.g., servers, computing devices, or the like), is configured to execute instructions 310, such as algorithms, modules, routines, applications and the like. Computing platform 302 includes memory 304, which may comprise volatile and non-volatile memory, such as read-only and/or random-access memory (RAM and ROM), EPROM, EEPROM, flash cards, or any memory common to computing platforms). Moreover, memory 304 may comprise cloud storage, such as provided by a cloud storage service and/or a cloud connection service.

Further, computing platform 302 also includes at least one processing device 306, which may be an application-specific integrated circuit ("ASIC"), or other chipset, logic circuit, or other data processing device. Processing device(s) 306 may execute one or more application programming interface (APIs) 320 that interface with any resident programs, such as instructions 310 or the like, stored in the memory 304 of the computing platform 302 and any external programs. Processing devices(s) 306 may include various processing subsystems (not shown in FIG. 4) embodied in hardware, firmware, software, and combinations thereof, that enable the functionality of the computing platform 302 and the operability of the computing platform 302 on the distributed computing network 110 (shown in FIG. 1). For example, processing subsystems allow for initiating and maintaining communications and exchanging data with other networked devices. For the disclosed aspects, processing subsystems of processing device 306 may include any subsystem used in conjunction with instructions 310 and related tools, routines, sub-routines, algorithms, sub-algorithms, sub-modules thereof.

Computing platform 302 may additionally include a communications module (not shown in FIG. 4) embodied in hardware, firmware, software, and combinations thereof, that enables electronic communications between the computing platform 302 and other network devices, such as resource interaction equipment provider systems 200 and distributed trust computing network 400 (shown in FIG. 2). Thus, communication module may include the requisite hardware, firmware, software and/or combinations thereof for establishing and maintaining a network communication connection with one or more network devices.

Memory 302 of computing platform 300 stores instructions 310 that are configured to be executable by the processing device(s) 306 and configured to connect and integrate one or more open Application programming Interface (API) services 320 with the plurality of resource interaction equipment provider systems 200-1-200-5 (shown in FIGS. 1 and 2). Integration of the API services 320 with the resource interaction equipment provider systems includes deploying and implementing a trusted entity security certificate 330 for securing data communications between the gateway apparatus 300 and the resource interaction equipment provider systems 200-1-200-5. As such, the present invention leverages the security features provided for by the trusted entity's security certificate. The security features may include, but are not limited to encryption 332 of data communication and identity verification 334.

In addition, integration of the API services 320 with the resource interaction equipment provider systems includes orchestration 340 of data communications between the gateway device 300 and the resource interaction equipment provider systems to track the status and occurrence of events 350 in a resource interaction equipment fulfillment process. Such orchestration may include, but is not limited to, communicating requests 352 to the resource interaction equipment provider systems requesting an action 350 and receiving status 354 updates on the event and/or confirmation 356 that event has occurred. Since the gateway apparatus 300 is in direct communication with each of the resource interaction equipment providers, the orchestration of the data communications further includes informing upstream resource interaction equipment provider as to progress/completion of downstream events that may affect the upstream resource interaction equipment provider or allowing resource interaction equipment provider to connect to the gateway to receive such information. Moreover, the information that is accessible to the resource interaction equipment providers is provider-specific, such that information is available to the providers on a need-to-know basis. As a result, the resource interaction providers are not required to be direct communication with upstream and/or downstream resource interaction equipment providers and, instead, can obtain information related to applicable upstream and/or downstream resource providers from the gateway apparatus.

Moreover, the instructions 310 include a tracking module 360 that is configured to generate a dynamic workflow 370 that tracks the progress of the resource interaction equipment fulfilment process based on the event 350 data received from the resource interaction provider systems 200-1-200-5. As such that gateway device 300 is able to provide an overall picture of the current state of the fulfillment process and assess how delays in completion of events may affect upstream providers and the overall completion of the fulfillment process. In addition, tracking module 360 tracks the specific API services 320 that are deployed to specific resource interaction provider systems 380.

Referring to FIG. 4 a flow diagram of a method 400 for managing fulfillment of resource interaction equipment, in accordance with embodiments of the present invention. At Event 410, open Application Programming Interface (API) services are connected to a plurality of resource interaction equipment provider systems. In specific embodiments of the invention in which the resource interaction equipment is a payment device, such as a point-of-sale (POS) device or the like, the resource interaction equipment providers are any entity that contributes hardware and software components to the device, installs hardware/software components in the device, assembles/manufacturers the device, stores the device, delivers/ships the device or the like. In such embodiments of the invention, the systems may be order systems, workflow systems, inventory systems, manufacturing system, customer relationship management (CRM) systems or any other system that tracks events related to the component or service that the provider/entity provides for the resource interaction equipment.

At Event 420, a trusted entity security certificate is deployed and implemented at the resource interaction equipment providers for securing data communications between a gateway apparatus and the resource interaction equipment provider systems. As such, the present invention leverages the security features, such as encryption and identity verification, provided for by the trusted entity's security certificate At Event 430, data communications between the gateway device and the resource interaction equipment provider systems are orchestrated to track the status and occurrence of events in a resource interaction equipment fulfillment process. Such orchestration may include, but is not limited to, communicating requests to the resource interaction equipment provider systems requesting an action and receiving status updates on the event and/or confirmation that event has occurred. Since the gateway apparatus is in direct communication with each of the resource interaction equipment provider, the orchestration of the data communications further includes informing upstream resource interaction equipment provider as to progress/completion of downstream events that may affect the upstream resource interaction equipment provider or allowing resource interaction equipment provider to connect to the gateway to receive such information. Moreover, the information that is accessible to the resource interaction equipment providers is provider-specific, such that information is available to the providers on a need-to-know basis. As a result, the resource interaction providers are not required to be direct communication with upstream and/or downstream resource interaction equipment providers and, instead, can obtain information related to applicable upstream and/or downstream resource providers from the gateway apparatus.

At Event 440, a dynamic overall workflow status is established/generated that tracks the progress of the resource interaction equipment fulfilment process based on the event data received from the resource interaction provider systems. As such that gateway device is able to provide an overall picture of the current state of the fulfillment process and assess how delays in completion of events may affect upstream providers and the overall completion of the fulfillment process. In addition, the information that is obtained by the gateway device from the various third-party provides forms a historical equipment data book for the equipment (e.g., serial numbers of components, which component and software are installed and the like).

Thus, present embodiments of the invention provides for management of resource interaction equipment fulfillment via a gateway apparatus that uses Application Programming Interface (API) services to connect and integrate with the various systems deployed by the equipment providers, such that, all data communication between the managing entity and the equipment providers is orchestrated through the gateway apparatus to track the occurrence of events associated with resource interaction equipment fulfillment. Additionally, a distributed trust computing network is implemented in which each of the equipment providers serve as a decentralized node in the distributed trust computing network capable of converging on a data block to verify the validity of the equipment fulfillment process event stored in the block.

The features, functions, and advantages that have been discussed may be achieved independently in various embodiments of the present invention or may be combined with yet other embodiments, further details of which can be seen with reference to the following description and drawings.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for managing resource interaction equipment fulfillment, the system comprising:
 a plurality of resource interaction equipment provider systems, wherein each of the resource interaction equipment provider systems are associated with one of a plurality of resource interaction equipment providers and track a resource interaction equipment provider-specific workflow related to fulfilling a resource interaction equipment provision;
 a gateway apparatus including a first computing platform having a first memory, one or more first processing devices in communication with the first memory, and one or more Application Programming Interface (API) services executable by the one or more first processing devices, wherein the one or more API services are collectively configured to:

connect and integrate with the plurality of resource interaction equipment provider systems, wherein integrating comprises, deploy and implement a trusted entity security certificate for securing data communications between the gateway apparatus and the plurality of resource interaction equipment provider systems, and orchestrate a flow of data communication between the gateway apparatus and the plurality of resource interaction equipment providers that tracks an occurrence of events in a resource interaction equipment fulfillment process, wherein the data communication that is orchestrated includes (i) commands from the gateway apparatus to perform one or more actions associated with fulfilling a resource interaction equipment provision, and (ii) responses from the resource interaction equipment providers indicating one of receipt of the commands, status of the one or more actions and completion of the one or more actions; and a tracking module stored in a second memory of a second computing platform, executable by one or more second processing devices in communication with the second memory and configured to;

establish, based on the occurrence of events in a resource interaction equipment fulfillment process, a dynamic overall workflow that tracks progress in fulfillment of the resource interaction equipment process.

2. The system of claim 1, further comprising:

at least one distributed trust computing network comprising a plurality of decentralized nodes, each decentralized node having a second memory and one or more second processing devices in communication with the second memory, wherein the second memory of the decentralized nodes is configured to store at least one distributed ledger comprising a plurality of blocks of data, wherein each block of data stores information pertaining to at least one of the events in a resource interaction equipment fulfillment process.

3. The system of claim 2, wherein the each of the plurality of resource interaction equipment providers are associated with one of the plurality of decentralized nodes, wherein two or more of the decentralized nodes converge on each block of data within the at least one distributed ledger to verify a validity of the information pertaining to the least one of the events.

4. The system of claim 2, wherein each block of data within the at least one distributed ledger is configurable to provide access to the block of data to one or more designated resource interaction equipment providers.

5. The system of claim 1, wherein the plurality of resource interaction equipment providers include (i) component manufacturers for components comprising the resource interaction equipment, (ii) equipment manufacturers for the resource interaction equipment, software providers for installing software on the resource interaction equipment, (iii) warehouse provides for physically storing the resource interaction equipment, and (iv) shipment provides for delivering components and resource interaction equipment to providers and resource interaction equipment users.

6. The system of claim 1, further comprising a plurality of resource interaction equipment user systems, wherein each of the resource interaction equipment user systems are associated with one of a plurality of resource interaction equipment users, wherein the API services are further collectively configured to:

connect and integrate with the plurality of resource interaction equipment user systems, wherein integrating comprises, deploy and implement the trusted entity security certificate for securing data communications between the gateway apparatus and the plurality of resource interaction equipment user systems, and orchestrate a flow of data communication between the gateway apparatus and the plurality of resource interaction equipment users.

7. The system of claim 6, further comprising:

at least one distributed trust computing network comprising a plurality of decentralized nodes, each decentralized node having a second memory and one or more second processing devices in communication with the second memory, wherein the second memory of the decentralized nodes is configured to store at least one distributed ledger comprising a plurality of blocks of data, wherein each block of data stores at least one of (i) information pertaining to at least one of the events in a resource interaction equipment fulfillment process and/or (ii) metadata information pertaining to the equipment.

8. The system of claim 1, wherein the tracking module is further configured to establish a list that tracks which of the plurality of API services are connected and integrated with which of the plurality of resource interaction equipment provider systems.

9. A computer-implemented method for managing resource interaction equipment fulfillment, the method is executed by one or more computing processor devices and comprises:

connecting one or more Applications Programming Interface (API) services with a plurality of resource interaction equipment provider systems;

deploying and implementing, through the one or more API, services, a trusted entity security certificate at the resource interaction equipment provider systems for securing data communications between the gateway apparatus and the plurality of resource interaction equipment provider systems;

orchestrating, through the one or more API services, a flow of data communication between the gateway apparatus and the plurality of resource interaction equipment providers that tracks an occurrence of events in a resource interaction equipment fulfillment process to orchestrate a flow of data communication between the gateway apparatus and the plurality of resource interaction equipment providers, wherein the data communication that is orchestrated includes (i) commands from the gateway apparatus to perform one or more actions associated with fulfilling a resource interaction equipment provision, and (ii) responses from the resource interaction equipment providers indicating one of receipt of the commands, status of the one or more actions and completion of the one or more actions; and establishing, based on the occurrence of events in a resource interaction equipment fulfillment process, a dynamic overall workflow that tracks progress in fulfillment of the resource interaction equipment process.

10. The computer-implemented method of claim 9, further comprising:

storing, within data blocks of at least distributed ledger stored within memory of a plurality of decentralized nodes of a distributed trust computing network, at least one of (i) information pertaining to at least one data communication between the gateway apparatus and one of the plurality of resource interaction equipment providers and/or (ii) metadata information pertaining to the equipment.

11. The computer-implemented method of claim 10, verifying validity of the information pertaining to the least one of the events based on two or more of the decentralized nodes converging on the data block containing the information, wherein each of the plurality of resource interaction equipment providers are associated with one of the plurality of decentralized nodes.

12. The computer-implemented method of claim 9, wherein the plurality of resource interaction equipment providers include (i) component manufacturers for components comprising the resource interaction equipment, (ii) equipment manufacturers for the resource interaction equipment, software providers for installing software on the resource interaction equipment, (iii) warehouse provides for physically storing the resource interaction equipment, and (iv) shipment provides for delivering components and resource interaction equipment to providers and resource interaction equipment users.

13. The computer-implemented method of claim 9, further comprising establishing a list that tracks which of the plurality of APIs are connected with which of the plurality of resource interaction equipment provider systems.

14. A computer program product comprising:
a non-transitory computer-readable medium comprising:
a first set of codes for causing a computer to connect one or more Applications Programming Interface (API) services with a plurality of resource interaction equipment provider systems;
a second set of codes for causing a computer to deploy and implement, through the one or more API, services, a trusted entity security certificate at the resource interaction equipment provider systems for securing data communications between the gateway apparatus and the plurality of resource interaction equipment provider systems;
a third set of codes for causing a computer to orchestrate, through the one or more API services, a flow of data communication between the gateway apparatus and the plurality of resource interaction equipment providers that tracks an occurrence of events in a resource interaction equipment fulfillment process to orchestrate a flow of data communication between the gateway apparatus and the plurality of resource interaction equipment providers, wherein the data communication that is orchestrated includes (i) commands from the gateway apparatus to perform one or more actions associated with fulfilling a resource interaction equipment provision, and (ii) responses from the resource interaction equipment providers indicating one of receipt of the commands, status of the one or more actions and completion of the one or more actions; and
a fourth set of codes for causing a computer to establish, based on the occurrence of events in a resource interaction equipment fulfillment process, a dynamic overall workflow that tracks progress in fulfillment of the resource interaction equipment process.

15. The computer program product of claim 14, further comprising:
a fifth set of codes for causing a computer to store, within data blocks of at least distributed ledger stored within memory of a plurality of decentralized nodes of a distributed trust computing network, at least one of information pertaining to at least one of the events in a resource interaction equipment fulfillment process.

16. The computer program product of claim 15,
a sixth set of codes for causing a computer to verify validity of the information pertaining to the least one of the events based on two or more of the decentralized nodes converging on the data block containing the information, wherein each of the plurality of resource interaction equipment providers are associated with one of the plurality of decentralized nodes.

17. The computer program product of claim 14, wherein the plurality of resource interaction equipment providers include (i) component manufacturers for components comprising the resource interaction equipment, (ii) equipment manufacturers for the resource interaction equipment, software providers for installing software on the resource interaction equipment, (iii) warehouse provides for physically storing the resource interaction equipment, and (iv) shipment provides for delivering components and resource interaction equipment to providers and resource interaction equipment users.

* * * * *